US005456171A

United States Patent [19]

Biava et al.

[11] Patent Number: 5,456,171

[45] Date of Patent: Oct. 10, 1995

[54] ENDLESS BELT-SHAPED ELEMENT FORMING IN PARTICULAR A PRESS-BLANKET

[75] Inventors: Helene Biava, Sausheim; Denis Hertzog, Ensisheim; Christian Reinhart, Ruelisheim; Gerard Rich, Orschwihr; Jean-Francois X. A. Van Den Bogaert, Cernay, all of France

[73] Assignee: Rollin S.A., Cernay, France

[21] Appl. No.: 326,798

[22] Filed: Oct. 20, 1994

Related U.S. Application Data

[63] Continuation of Ser. No. 45,844, Apr. 9, 1993, abandoned.

[30] Foreign Application Priority Data

Apr. 10, 1992 [FR] France .................................. 92 04452

[51] Int. Cl.$^6$ .................................. B32B 27/02

[52] U.S. Cl. .................................. 101/122; 101/DIG. 48; 428/229; 428/909

[58] Field of Search .................................. 101/122, 389.1, 101/368, 111, DIG. 48; 428/221, 224, 225, 226, 227, 228, 229, 232, 909

[56] References Cited

U.S. PATENT DOCUMENTS

| | | | |
|---|---|---|---|
| 3,453,900 | 7/1969 | Orndorff, Jr. et al. | 74/219 |
| 3,992,958 | 11/1976 | Bonnefon | 74/231 |
| 3,998,986 | 12/1976 | Williams | 428/102 |
| 4,127,039 | 11/1978 | Hollaway, Jr. | 74/232 |
| 4,224,370 | 9/1980 | Heinemann | 428/246 |
| 4,559,258 | 12/1985 | Kiuchi | 428/156 |
| 4,705,161 | 11/1987 | Gozdiff | 198/847 |
| 4,752,282 | 6/1988 | Habegger | 474/263 |
| 4,832,672 | 5/1989 | Bielfeldt | 474/260 |
| 4,981,750 | 1/1991 | Murphy et al. | 428/220 |
| 5,294,481 | 3/1994 | Nakamura et al. | 101/DIG. 48 |

FOREIGN PATENT DOCUMENTS

| | | |
|---|---|---|
| 1307230 | 2/1973 | European Pat. Off. . |
| 0293989 | 12/1988 | European Pat. Off. . |
| 0380262 | 8/1990 | European Pat. Off. . |
| 0479591 | 4/1992 | European Pat. Off. . |
| 0520570 | 12/1992 | European Pat. Off. . |
| 0522640 | 1/1993 | European Pat. Off. . |
| 8905562 | 8/1989 | Germany . |

*Primary Examiner*—Ren Yan
*Attorney, Agent, or Firm*—Woodcock, Washburn, Kurtz, Mackiewicz & Norris

[57] ABSTRACT

A belt-shaped element for printing textiles. The belt is a sandwich structure shaped to conform around two textile printing machine cylinders, and operative to move fabric articles thereon past printing stations with minimal registration error. An exemplary belt has at least one outer elastomer layer, or "working layer," and an inner "cylinder" layer that is innermost against the printing machine cylinders. An exemplary cylinder layer comprises a sheet of fibers oriented longitudinally and having a rigidity of $10^6$–$10^7$ megapascals in the longitudinal direction. Other exemplary belts comprise an intermediate layer between the outer elastomer and inner fiber sheet layers. An exemplary intermediate layer comprises a layer of transverse fibers.

17 Claims, 5 Drawing Sheets

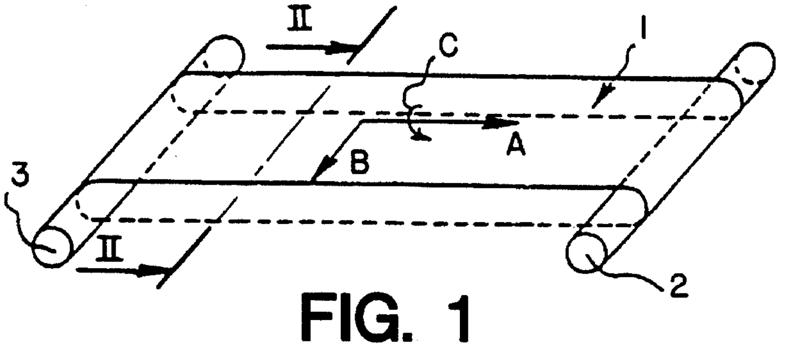
FIG. 1
FIG. 2
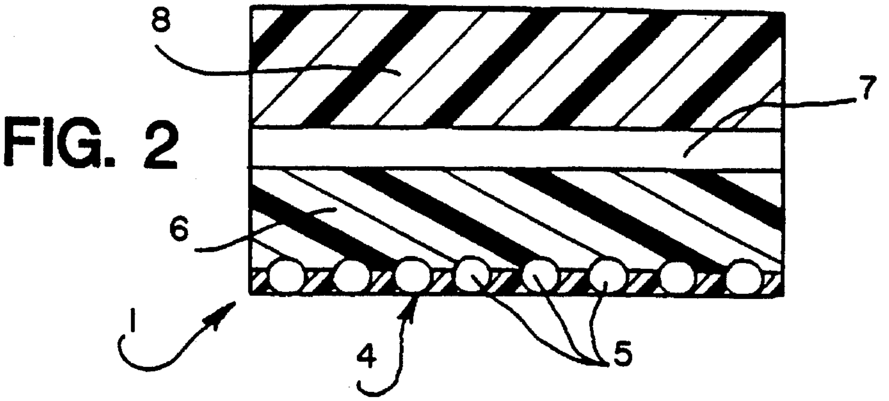
FIG. 3
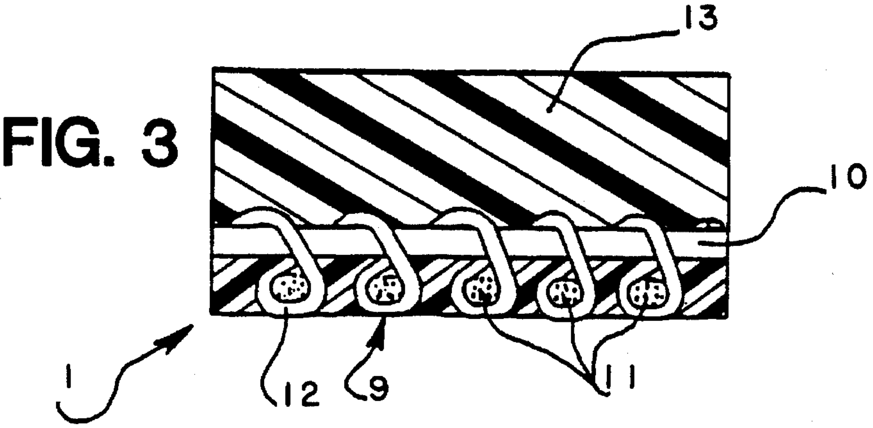
FIG. 4A
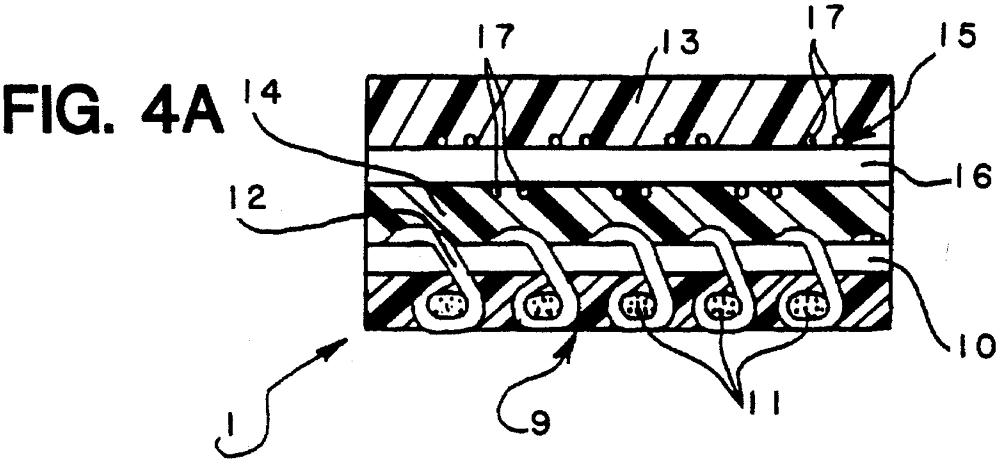

ENDLESS BELT-SHAPED ELEMENT FORMING IN PARTICULAR A PRESS-BLANKET

This is a continuation of co-pending application Ser. No. 08/045,844 filed on Apr. 9, 1993, now abandoned.

BACKGROUND OF THE INVENTION

1. Field of the Invention

The present invention relates to an endless belt-shaped element forming in particular a textile printing press-blanket.

2. Description of Related Art

Textile printing machines are known, generally comprising an endless cloth or belt surrounding two cylinders one of which is rotated so as to drive the endless belt at a constant speed and above which belt are arranged successive printing means adapted to print patterns with different colors upon a web of fabric driven by the endless belt and held in sandwich-like relationship between this belt and the printing means.

The textile printing cloth has a sandwich-like structure consisting of several more or less thick layers of different materials to allow the printing of the fabric resting upon the belt through compression of the printing means upon the fabric.

The different composite structures of textile printing clothes however which have been designed until now have not given full satisfaction. These known structures indeed impart to the cloth a somewhat variable elasticity causing an irregularity in the travelling speed of the cloth. It then results therefrom an "offset" or "registering inaccuracy" of the colored patterns printed in overlying relationship by the successive printing means upon the fabrics disposed onto the printing cloth.

Such a registering inaccuracy may amount to several tenths of a millimeter which is detrimental to the quality of the fabric. As a matter of fact a registring inaccuracy greater than ±0.1 mm (shift of two colors) becomes visible with very "registering" printed designs and may cause the production carried out on the machine to be rejected in extreme cases.

SUMMARY OF THE INVENTION

The purpose of the invention is therefore to provide an endless textile printing cloth or belt with a composite structure such that the registering inaccuracy on the fabric be reduced to as low a value as possible not exceeding in any case about one tenth of a millimeter.

For this purpose the invention relates to an endless belt-shaped drive element adapted to co-operate with at least one drive cylinder and of the type comprising a cylinder layer associated with at least one working layer and which is characterized in that the cylinder layer only has a high longitudinal rigidity characteristic.

The longitudinal rigidity of the aforesaid cylinder layer has a value lying between about $10^6$ and $10^7$ Newtons per meter (N/m), preferably between 1.5 and $2.5\times10^6$ N/m.

Preferably the aforesaid cylinder layer consists of a sheet of threads and/or of longitudinal fibres of monofilaments made from a polyester-, polyamide-, polyethylene-, aramide-, glass-, carbon-, metal-based material or the like.

According to an alternative embodiment the aforesaid cylinder layer consists of a sheet of threads and/or of longitudinal fibres each one consisting of multifilaments made from a polyester-, polyamide-, polyethylene-, aramide-, glass-, carbon-, metal-based material or the like.

According to still another alternative embodiment the cylinder layer consists of a sheet of threads and/or of longitudinal fibres formed of both monofilaments and multifilaments of the same material or of different materials with a polyester, polyamide, polyethylene, aramide, glass, carbon, metal base or the like.

The aforesaid multifilaments of each longitudinal thread and/or fibre of the cylinder layer are made from the same material or from different materials.

The element in addition comprises one or several intermediate layers held in sandwich-like fashion between the working layer and the cylinder layer and contributing to the transverse tensile and bending rigidity of the element.

The transverse tensile stiffness of the intermediate layer(s) is lying between about $10^4$ and $10^8$ N/m and the transverse bending stiffness of this layer or of these layers is at least 0.05 N.m/radian.

According to a first embodiment the element comprises two intermediate layers consisting of a sheet of threads and/or of transverse fibres of monofilaments and of a layer of elastomer for connection between the sheet of threads and/or of transverse fibres and the cylinder layer.

According to a second embodiment the element comprises an intermediate layer consisting of a sheet of threads and/or of transverse fibres of monofilaments.

According to a third embodiment the element comprises three intermediate sheets consisting successively towards the working layer of a sheet of threads and/or of transverse fibres of monofilaments, of a connecting layer of elastomer and of a cloth with a small modulus of elasticity in the longitudinal direction and consisting of threads and/or of transverse fibres of monofilaments joined to each other by flexible cotton or polyester threads above and below the said fibres and/or threads.

According to a fourth embodiment the element comprises three intermediate layers consisting successively towards the working layer of a sheet of threads and/or of transverse fibres each one consisting of multifilaments, of a connecting sheet of elastomer and of a cloth with a small modulus of elasticity in the longitudinal direction and consisting of threads and/or of transverse fibres of monofilaments joined to one another by flexible cotton or polyester threads above and below the said fibres and/or threads.

According to a fifth embodiment the element comprises three intermediate layers consisting successively towards the working layer of a sheet of threads and/or of transverse fibres of monofilaments, of a connecting layer of elastomer and of a balanced cloth with yielding threads in both transverse and longitudinal directions made from cotton or from polyester.

The threads and/or aforesaid transverse fibres are made from a polyester-, polyamide-, polyethylene-, glass-, carbon-, metal-based material or the like.

The threads and/or longitudinal fibres of the cylinder layer and the threads and/or transverse fibres of the aforesaid intermediate layers are impregnated with elastomer.

Furthermore at least one of the intermediate layers may consist of a sheet of threads and/or transverse fibres formed of both monofilaments and multifilaments of the same material or of different materials with a polyester, polyamide, polyethylene, glass, carbon, metal base or the like.

The multifilaments of each thread and/or transverse fibre of the intermediate layer are made from the same material or from different materials.

The cylinder layer has a thickness lying between about 0.2 and 1.5 millimeter, preferably between about 0.3 and 0.9 millimeter, the working layer has a thickness lying between about 0.1 and 1.0 millimeter, preferably between about 0.5 and 0.7 millimeter and the total thickness of the element is lying between about 1.5 and 4 millimeters, preferably between about 1.9 and 2.8 millimeters.

The working layer is made from an elastomer with a Young's modulus lying between about 1.0 and 500 Megapascals (MPa), preferably between 5 and 100 MPa.

The aforesaid different layers of the element are connected to each other by self-adhesion or by adhesive bonding agents.

BRIEF DESCRIPTION OF THE DRAWINGS

The invention will be better understood and further objects, characterizing features, details and advantages thereof will appear more clearly in the course of the explanatory description which will follow, made with reference to the accompanying diagrammatic drawings given by way of example only, illustrating several embodiments of the invention and in which:

FIG. 1 diagrammatically shows an endless belt-shaped element adapted to form a textile printing blanket;

FIG. 2 is a view in cross-section along the line II—II of FIG. 1, showing a composite structure of the element according to a preferred embodiment of the invention;

FIGS. 3, 4A, 4B, 5A, 5B and 6 are views in section similar to that of FIG. 2 and showing further embodiments of the element according to the invention;

DESCRIPTION OF PREFERRED EMBODIMENTS

Figure 4B:
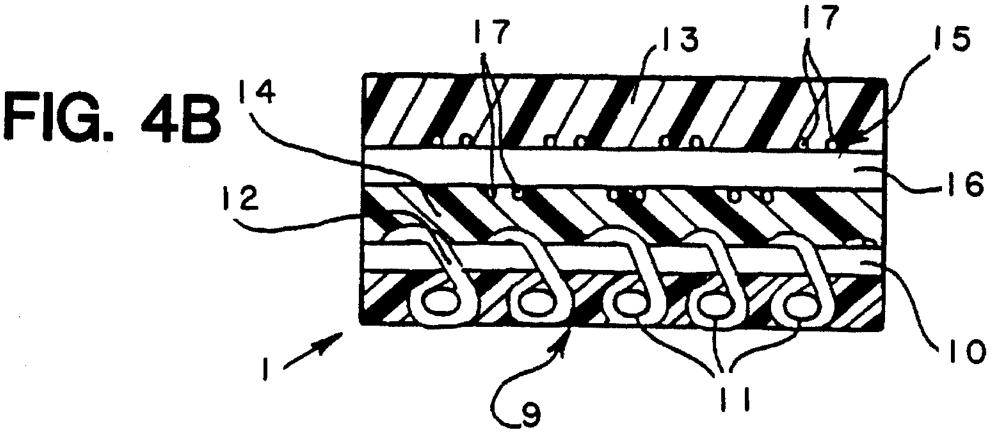

Referring to FIG. 1 the reference numeral 1 designates an endless strip, in particular a belt adapted to carry along a fabric having to receive successive printings, surrounding two cylinders 2, 3, one of which, for example the cylinder 2, is rotated so that the belt 1 be driven at a constant speed in a longitudinal direction shown by the arrow A.

The belt 1 or textile printing cloth forms a part of a textile printing machine known per se, comprising, arranged above the belt 1, cylinders or flat frames forming successive printing means which may print patterns of different colors upon a web of fabric carried along by the belt 1. The belt or cloth 1 is obtained in an endless configuration by a junction provided on a reduced area which does not cause any deterioration from the standpoint of performances. This junction is a means known per se and carried out either on the location of the machine or in the factory workshop producing clothes prior to the mounting on the machine.

The belt or cloth 1 is a critical component for the quality of the printed fabric and should thus has a sandwich-like structure consisting of several layers allowing to reduce the registering inaccuracy previously discussed to as small a value as possible.

For that purpose and according to the invention the sandwich-like structure of the belt or cloth 1 is defined in a general manner by the following different essential layers:

- a lower layer or cylinder layer providing an exclusive contribution to the longitudinal or circumferential rigidity in the direction A, the exclusivity technically corresponding to the fact that the other layers taken separately or all together as a whole are contributing in a negligeable manner to this rigidity;
- an outer layer or working layer upon which is arranged the fabric to be printed and having chemical and mechanical characteristics adapted to the process of textile printing, i.e. with chemical and/or mechanical properties consistent with the products of printing, of surface flexibility, of non-marking of the printed fabric by the subjacent reinforcing layers which are not homogeneous and of resistance to shocks, to scratches and to abrasion; and
- one or several intermediate layers together providing the transverse tensile rigidity of the belt or cloth 1 in the direction B perpendicular to the direction A and the bending rigidity or degree of freedom of rotation about the longitudinal axis of the belt 1 as shown by the arrow shaped as an arc of a circle C. The intermediate layers also form connecting layers providing the integrity of the belt 1.

The rigidities in the directions A and B are defined as being the quotient of the tension of the belt (expressed in N/m) by the elongation thereof expressed as a percentage.

The rigidity of the cylinder layer in the direction A has a value lying between about $10^6$ and $10^7$ Newtons per meter (N/m) of cloth width, this rigidity corresponding to an elongation of 0.1 to 1% under a tension of 100 Newtons per centimeter of cloth width. Preferably the rigidity has a value lying between 1.5 and $2.5\times10^6$ N/m. The cylinder layer has a thickness lying between about 0.2 and 1.5 millimeter and preferably lying between 0.3 and 0.9 millimeter.

The working layer is made from an elastomer with a Young's modulus lying between about 1.0 and 500 Megapascals (MPa) and preferably between 5 and 100 MPa. The thickness of the working layer is lying between about 0.1 and 1.0 millimeter and is preferably lying between 0.5 and 0.7 millimeter.

The intermediate layer(s) which is or are collectively providing the stiffness of the belt 1 in the directions B and C as well as the connection between the assembly of layers of the belt has or have a transverse tensile rigidity in the direction B lying between about $10^4$ and $10^8$ N/m. Preferably this rigidity is lying between $10^5$ and $5\times10^6$ N/m. The rigidity of the intermediate layer(s) in the direction C preferably is higher than 0.05 N.m/radian per meter of cloth length. This cloth rigidity corresponds to the product of multiplication of the Young's modulus E by the inertia I with a homogeneous beam. The limit value corresponds to a deflection camber, due to the own weight of the cloth of 2.5 kg/m$^2$, of 6.25 millimeters for an overhang of 10 centimeters and to a deflection camber of 10 centimeters for an overhang of 20 centimeters.

The aggregate thickness of the belt or cloth 1 is lying between 1.5 and 4 millimeters and is preferably lying between 1.9 and 2.8 millimeters.

The different embodiments of the belt or cloth 1 the different layers of which have the operating characteristics referred to hereinabove will now be described successively.

According to the preferred embodiment shown on FIG. 2 the sandwich structure of the belt 1 comprises a cylinder layer 4 consisting of a sheet of threads and/or of longitudinal fibres 5 oriented in the direction A and each one formed of a monofilament made from a polyester-, polyamide-, polyethylene-, glass-, metal-based material or the like, a connecting layer of elastomer 6 of 0.7 millimeter of thickness disposed over the cylinder layer 4, a layer 7 consisting of a sheet of threads and/or of transverse fibres of monofilaments in the direction B with a thickness of 0.35 millimeter and made from a polyester-, polyamide-, polyethylene-, glass-, metal-based material or the like and a working layer of elastomer 8 with a thickness of 0.6 millimeter. The cylinder layer 4 has a thickness of 0.35 millimeter so that the aggregate thickness of the belt 1 is 2 millimeters. The layers 6 and 7 are of course forming the intermediate connecting layers with properties with transverse tensile and bending rigidities such as defined previously.

According to a second embodiment shown on FIG. 3 the belt 1 comprises three layers wherein the cylinder layer 9 and the single intermediate layer 10 are combined together to form a technical fabric with a weave such as a grate, Malimo (registred trademark), Rachel (registered trademark), the cylinder layer 9 consisting of threads and/or of longitudinal fibres 11 with a longitudinal rigidity such as set forth previously, each one formed of multifilaments made from a polyester-, polyamide-, polyethylene-, aramide-, glass-, carbon-, metal-based material or the like, various combinations of materials forming the fibres 11 being possible. The intermediate layer 10 with the transverse tensile and bending rigidities such as previously defined consists of a sheet of threads and/or of fibres of monofilaments with a diameter of 0.35 millimeter oriented in the transverse direction B and made from a polyester-, polyamide-, polyethylene-, glass-, carbon-, metal-based material or the like. The threads and/or longitudinal fibres 11 are assembled to each one of the monofilaments of the layer 10 through the medium of fine threads of polyester 12 or the like wound about each monofilament and playing no operating part. The working layer of elastomer 13 has a thickness of 0.85 millimeter whereas the cylinder layer 9 has a thickness of 0.87 millimeter so that the aggregate thickness of the belt 1 be 2.07 millimeters.

The sandwich structure of the belt 1 forming the third embodiment of the invention shown on FIG. 4A comprises five layers wherein the cylinder layer 9 and the adjacent intermediate layer 10 are identical with the layers 9 and 10 of the second embodiment with however the cylinder layer 9 having a thickness of 0.82 millimeter and the threads and/or fibres of monofilaments of the layer 10 having a diameter of 0.35 millimeter so that the grate structure of the layers 9 and 10 have a total thickness of 1.17 millimeter. This belt structure also comprises two other intermediate layers arranged between the intermediate layer 10 and the working layer 13 and comprising a connecting layer of elastomer 14 with a thickness of 0.18 millimeter and a layer 15 consisting of a cloth with a small modulus of elasticity in the longitudinal direction, consisting of threads and/or of transverse fibres of monofilaments 16 and of flexible cotton or polyester threads 17 joining the fibres 15 while extending above and below the latter. The threads and/or transverse fibres 16 are made from a polyester-, polyamide-, polyethylene-, glass-, carbon-, metal-based material or the like. The three intermediate layers 10, 14, 15 are of course contributing to the transverse tensile and bending rigidity as mentioned previously. The threads and/or fibres of monofilaments of the layer 15 have a diameter of 0.25 millimeter, the working layer 13 has a thickness of 0.55 millimeter so that the total thickness of the belt 1 is 2.15 millimeters. The composite structure shown on FIG. 4B is similar to that of FIG. 4A except for the sheet of the layer 9 formed of threads and/or fibres with monofilaments 11.

Figure 5A:
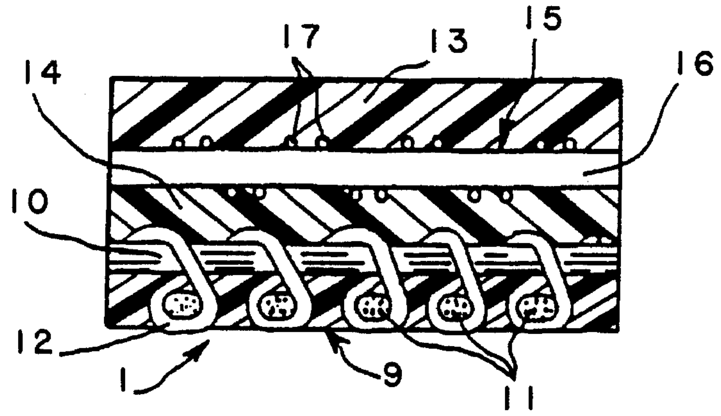
Figure 5B:
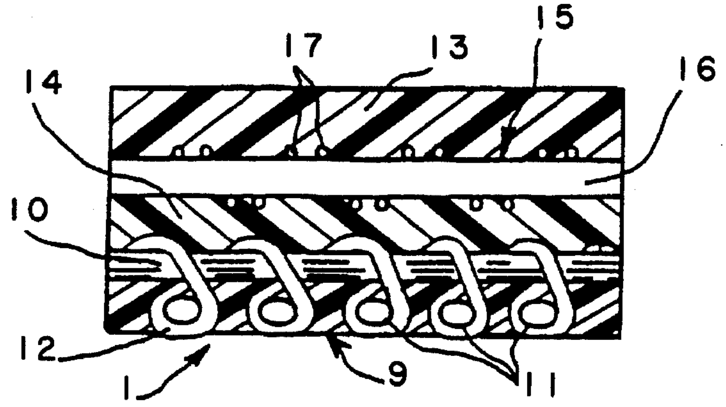

FIG. 5A shows the fourth embodiment of the belt 1 comprising five layers with operating characteristics identical with those of the five layers of the embodiment shown on FIG. 4A. This fourth embodiment differs from the one of FIG. 4A only by the layer 10 consisting of a sheet of threads and/or of transverse fibres of multifilaments oriented in the direction B. According to this embodiment the layer 9 has a thickness of 0.82 millimeter, the layer 10 has a thickness of 0.22 millimeter, the layer of elastomer 14 has a thickness of 0.15 millimeter, the layer 15 has a thickness of 0.39 millimeter and the working layer 13 has a thickness of 0.6 millimeter thereby leading to a total thickness of the belt 1 of 2.18 millimeters. The composite structure shown on FIG. 5B is similar to that of FIG. 5A except for the sheet of the layer 9 formed of threads and/or fibres with monofilaments 11.

Figure 6:
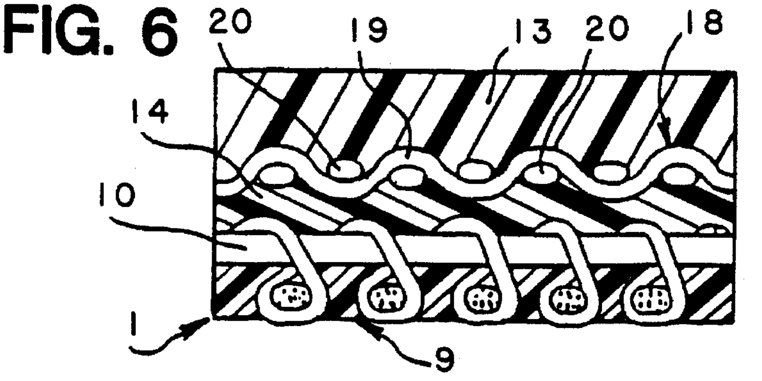

The fifth embodiment shown on FIG. 6 illustrates a structure with five layers of the belt 1 comprising three intermediate layers interposed between the cylinder layer 9 and the working layer 13 identical with the cylinder layer 9 and with the working layer 13, respectively, of the embodiment of FIG. 4 except for the thickness of the layer 9 in the present case of 0.8 millimeter for a total thickness of the layers 9 and 10 of 1.1 millimeter. The three intermediate layers successively comprise from the cylinder layer 9 to the working layer 13 the layer 10 formed of a sheet of threads and/or of fibres of monofilaments in the direction B identical with the sheet of the layer 10 of FIG. 4, a connecting layer of elastomer 14 with a thickness of 0.25 millimeter and a layer 18 formed of a balanced cloth with a thickness of 0.40 millimeter with flexible threads 19, 20 in both transverse and longitudinal directions of the belt 1 and made from cotton, polyester or the like. The working layer 13 has as in the embodiment of FIG. 4 a thickness of 0.55 millimeter thereby resulting in a total thickness of the belt 1 of 2.30 millimeters.

Further embodiments of the composite structure of the cloth 1 may be contemplated. Thus each sheet of threads and/or of fibres of the cylinder layer and/or of the intermediate layer may be formed of both monofilaments and multifilaments of the same material or of different materials. Moreover the multifilaments of each thread and/or longitudinal and/or transverse fibre mentioned hereinabove may be made from the same material or from different materials.

The threads and/or longitudinal and transverse fibres with multifilaments or with monofilaments of the layers of the different embodiments described hereinabove are impregnated with elastomer. The different layers of the embodiments of the belt 1 are connected to each other by self-adhesion or by means of adhesive bonding agents.

It should furthermore be pointed out that the values of the thicknesses of the cylinder and intermediate layers defined in the different embodiments referred to hereinabove are given in the case where the threads and/or fibres forming these layers are made from polyester, it being understood that different values of thicknesses will be adopted when these threads and/or fibres will be made from a different material.

Figure 9:
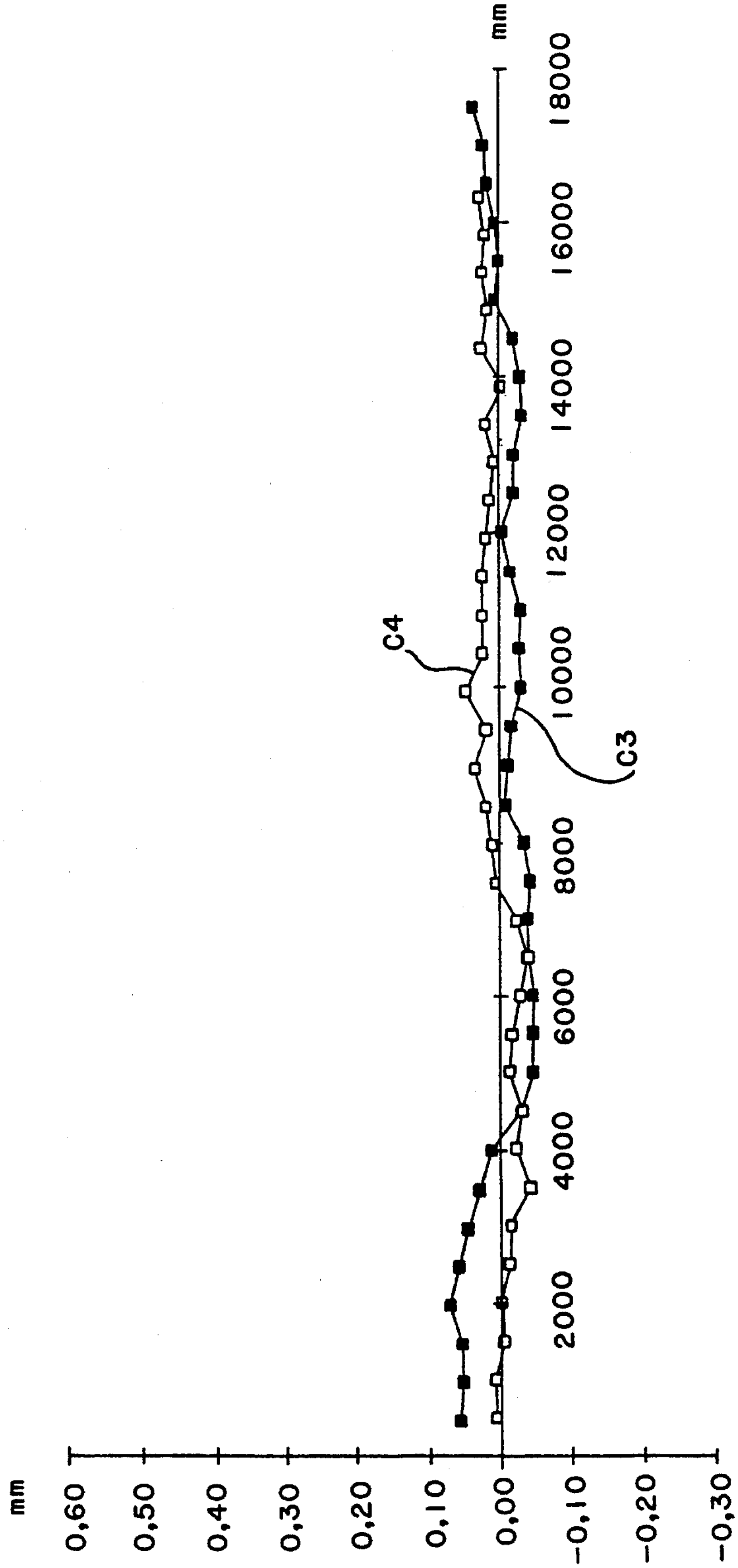
FIG. 9 shows two curves of variation of the registering inaccuracy resulting from the use of two textile printing clothes, respectively, according to the invention.

The composite structure of the belt 1 forming a textile printing blanket such as defined in each one of the embodiments shown on FIGS. 2 to 6 would substantially decrease the value of registering inaccuracy the variations of which versus the development of the cloth are always smaller than one tenth of a millimeter as this appears from FIG. 9.

Figure 8:
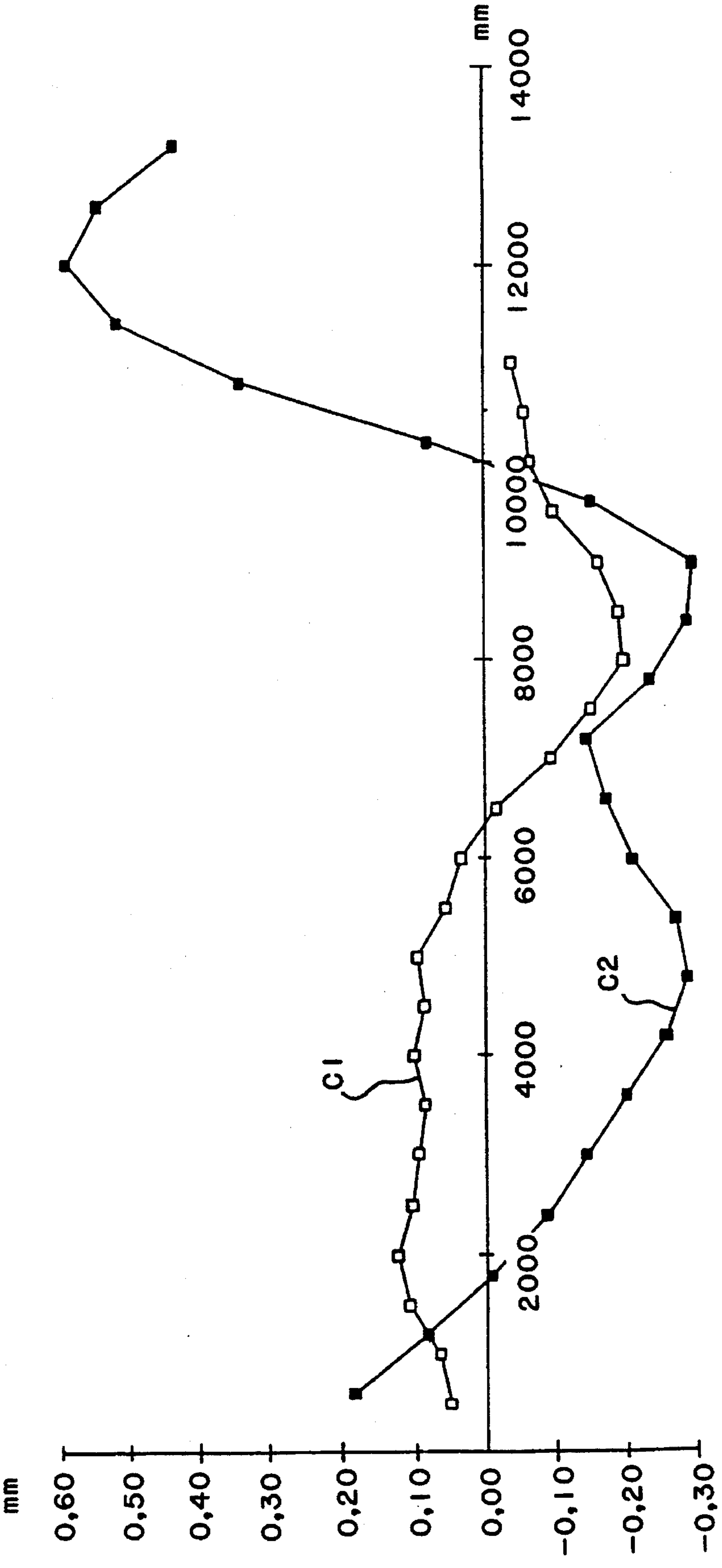
FIG. 8 shows two curves of the variation of the registering inaccuracy resulting from the use of two conventional textile printing clothes.

More specifically two of the embodiments of the belt 1, namely those shown on FIGS. 4A and 5A have been tested by way of example in comparison with two belts forming conventional textile printing blankets, the test results of which are shown on FIG. 8.

Figure 7:
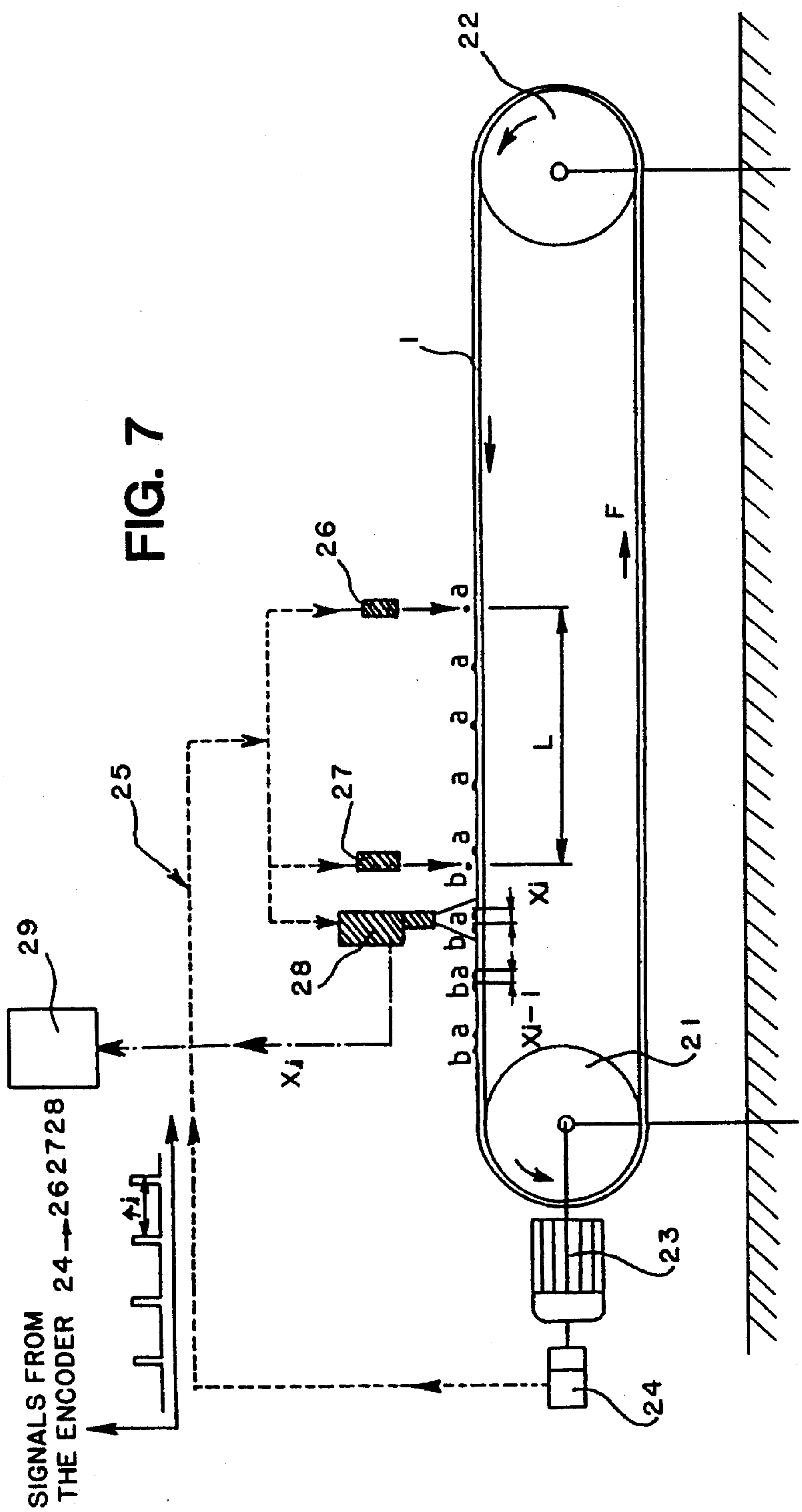
FIG. 7 diagrammatically illustrates a machine allowing to measure with a great accuracy the value of the registering inaccuracy resulting from the use of the printing blanket according to the invention in comparison with known printing blankets.

The machine which has been used to control the different printing blankets referred to hereinabove is diagrammatically shown on FIG. 7 and has already been described in detail in the French patent application N°91 02 041 filed on Feb. 20, 1991 in the name of the applicant.

This control machine comprises two cylinders 21, 22 one 21 of which is rotated by a motor 23 so as to drive the belt 1 to be tested according to the arrow F. An encoder 24 is mechanically connected to the shaft of the motor 23 and electrically connected by a wiring 25 to two systems 26, 27 for the injection of a colorant such as ink and to a videocamera 28. A computer 29 is connected to the videocamera 28 and allows the computation of the registering inaccuracy involved by the belt 1.

For that purpose a strip of adhesive film (not shown) is stuck onto the endless belt to be tested 1 in order to serve as a printing support for the ink drops issuing from the injection systems 26, 27. It should be noted that the encoder 24 gives the order to the injection systems 26, 27 for each displacement $p_i$ of the belt 1 to simultaneously print a drop a, b onto the cloth 1, whereafter the registering inaccuracy generated by the irregularities of the belt will be controlled by the camera 28 downstream of the injection system 27.

More specifically the deviations $X_i$ between two drops a, b are measured by the camera 28 and each deviation value between two drops is stored in the computer 29. The computer 29 would calculate the mean of the different deviations $X_i$ measured by the camera 28, i.e.:

$$\bar{X} = 1/n \sum_{i=1}^{n} X_i$$

The computer 29 then effects the difference between the deviation $X_i$ instantly measured by the camera 28 and the aforesaid mean of the deviations $\bar{X}$ to yield the value $d_i$ of the registering inaccuracy, i.e.:

$$d_i = X_i - \bar{X}$$

The screen of the computer 29 will thus visualize as a curve the different values of $d_i$ according to the position of the belt to be tested 1.

On FIG. 8 are thus seen two curves C1 and C2 illustrating the values of the registering inaccuracies of two conventional textile printing clothes versus the distance along each belt or cloth 1. These curves have been obtained from the following parameters:

the distance L between both injection systems 26, 27: 3 meters;

the distance between two measuring points, i.e. between two successive drops a and b: 0.5 meter; and the tension of the belt 1: 3.5 kg/cm.

It is thus found according to the curve C1 obtained that the measured registering inaccuracy varies between a negative value of about −0.10 millimeter and a positive value of about 0.20 millimeter whereas according to the curve C2 the measured registering inaccuracy varies between about −0.3 mm and +0.6 mm, which values are detrimental to the appearance of the printed fabric.

On the contrary the curves C3 and C4 illustrated on FIG. 9 show that the values of the registering inaccuracy vary between ±0.08 millimeter (curve C3) for the belt 1 forming the subject of the embodiment of FIG. 4A (distance L between injection systems 26, 27 of 5 meters, distance between two measuring points of 0.5 meter and belt tension of 3.5 kg/cm) and between ±0.05 millimeter (curve C4) for the belt 1 forming the subject of the embodiment shown on FIG. 5A (distance L of 5 meters, distance between two measuring points of 0.5 meter and belt tension of 3.5 kg/cm).

There has therefore been provided according to the invention a belt forming a textile printing blanket achieving a registering inaccuracy of an extremely reduced value owing in particular to the relatively high longitudinal rigidity property of the cylinder layer. The invention is of course not limited to a textile printing blanket only but is also applicable to any type of endless belt intended to accurately transport or carry along particular parts or objects without any registering inaccuracy.

We claim:

1. An endless belt-shaped element for printing textiles, comprising: An endless belt shaped to surround two textile printing machine cylinders, the endless belt having an innermost layer for disposition against the textile printing machine cylinders and at least one outer elastomer layer, said innermost cylinder layer comprising belt rigidity enhancing means, said belt rigidity enhancing means including a sheet of longitudinally oriented fibers and having a longitudinal rigidity between $10^6$ and $10^7$ Newtons per meter.

2. The endless belt-shaped element of claim 1 wherein said innermost layer has a longitudinal rigidity of $1.5\times10^6$ Newtons per meter to $2.5\times10^6$ Newtons per meter.

3. The endless belt-shaped element of claim 1 wherein said sheet of longitudinal fibers comprise monofilaments selected from the group consisting of polyester, polyamide, polyethylene, aramide, glass, carbon fibers, and metals.

4. The endless belt-shaped element of claim 1 wherein said innermost layer comprises a sheet of longitudinal fibers, each one consisting of multi-filaments selected from the group consisting of polyester, polyamide, polyethylene, aramide, glass, carbon fibers, and metals.

5. The endless belt-shaped element of claim 1 wherein said innermost layer comprises a sheet of longitudinal fibers formed of both monofilaments and multi-filaments.

6. The endless belt-shaped element of claim 1 further comprising at least one intermediate layer between said outer layer and said innermost layer.

7. The endless belt-shaped element of claim 1 further comprising an intermediate layer between said innermost and outer layers, said intermediate layer comprising fibers.

8. The endless belt-shaped element of claim 7 wherein said intermediate layer is connected to said innermost sheet of longitudinal fibers.

9. An endless belt-shaped element for printing textiles, comprising: a belt having a sandwich structure conformed for mounting around two textile printing machine cylinders, said sandwich structure comprising belt rigidity enhancing means, said belt rigidity enhancing means including an innermost sheet layer of fibers made from a material selected from the group consisting of polyester, polyamide, polyethylene, glass, and metals, said fibers being oriented longitudinally within the belt, said innermost layer having a rigidity in the longitudinal direction of $10^6$–$10^7$ Newtons per meter; and at least one elastomer layer superimposed upon the outer surface of said innermost sheet layer of longitudinal fibers.

10. The endless belt-shaped element of claim 9 wherein said belt has at least one intermediate layer between said elastomer layer and said innermost sheet layer having longitudinal fibers.

11. The endless belt of claim 10 wherein said at least one intermediate layer comprises transverse fibers.

12. The endless belt of claim 11 wherein said at least one intermediate layer is connected to said innermost sheet layer of longitudinal fibers.

13. The endless belt of claim 11 wherein said transverse fibers are made of material selected from the group consisting of polyester, polyamide, polyethylene, glass, carbon, and metal.

14. The endless belt of claim 13 wherein said longitudinal fibers of said innermost sheet layer of fibers are comprised of monofilaments or multifilaments.

15. The endless belt of claim 9 further comprising a cloth layer.

16. The endless belt of claim 9 further comprising a cloth layer comprising threads in transverse and longitudinal directions.

17. The endless belt of claim 9 wherein one of said layers has a modulus between 1.0 and 500 megapascals.

* * * * *